United States Patent [19]

Snider

[11] Patent Number: 4,588,886

[45] Date of Patent: May 13, 1986

[54] FIBER OPTICS CONDITION SENSOR AND METHOD OF MAKING SAME

[75] Inventor: Harold F. Snider, Mansfield, Ohio

[73] Assignee: Thermo-O-Disc Incorporated, Mansfield, Ohio

[21] Appl. No.: 550,817

[22] Filed: Nov. 14, 1983

[51] Int. Cl.$^4$ .............................................. H01J 5/16
[52] U.S. Cl. ................................ 250/227; 250/231 P; 73/705
[58] Field of Search ............... 250/231 R, 231 P, 221, 250/227, 229; 73/705, 715, 717, 723; 374/19, 143, 161, 205

[56] References Cited

U.S. PATENT DOCUMENTS

| | | | |
|---|---|---|---|
| 3,273,447 | 9/1966 | Frank | 88/1 |
| 3,378,656 | 4/1968 | Johnson | 203/83 |
| 3,500,278 | 3/1970 | Them | 337/354 |
| 3,573,700 | 4/1971 | Schmitt | 337/347 |
| 3,580,082 | 5/1971 | Strack | 73/406 |
| 3,676,817 | 7/1972 | Bletz | 337/347 |
| 3,720,090 | 3/1973 | Halpert et al. | 73/4 |
| 4,204,742 | 5/1980 | Johnson et al. | 350/96.20 |
| 4,309,618 | 1/1982 | Carter, Jr. et al. | 250/561 |
| 4,322,978 | 4/1982 | Fromm | 73/705 |
| 4,322,979 | 4/1982 | Fromm | 73/705 |
| 4,358,960 | 11/1982 | Porter | 73/705 |
| 4,428,239 | 1/1984 | Johnston | 73/705 |
| 4,487,206 | 12/1984 | Aagard | 73/705 |
| 4,521,683 | 6/1985 | Miller | 250/231 P |

Primary Examiner—David C. Nelms
Attorney, Agent, or Firm—Pearne, Gordon, Sessions, McCoy, Granger, Tilberry

[57] ABSTRACT

A fiber optics condition sensor and a method of producing such a device is disclosed. A bundle of optical fibers provides a planar termination on one end and is bifurcated to provide one group adapted to be connected to a light source and another group adapted to be connected to a detector. A shallow, curved, thin metallic diaphragm provides a central portion movable toward and away from the termination in response to the condition being sensed in order to vary the light reflected to the detector and therefore produce a detector output signal which is a function of the changes in conditions being sensed. The diaphragm may be formed of bimetal for sensing temperature conditions, or of a homogeneous metal to sense pressure. The curvature formed in the diaphragm is selected to provide movement of the central portion of the diaphragm through a distance selected to match the reflective light intensity versus spacing curve so that the system provides substantially the maximum response over a predetermined range of conditions being sensed. Variations in the curvature of the diaphragm are compensated for in the mounting of the diaphragm with respect to the fiber optics termination so as to ensure maximum response in the total system.

17 Claims, 10 Drawing Figures

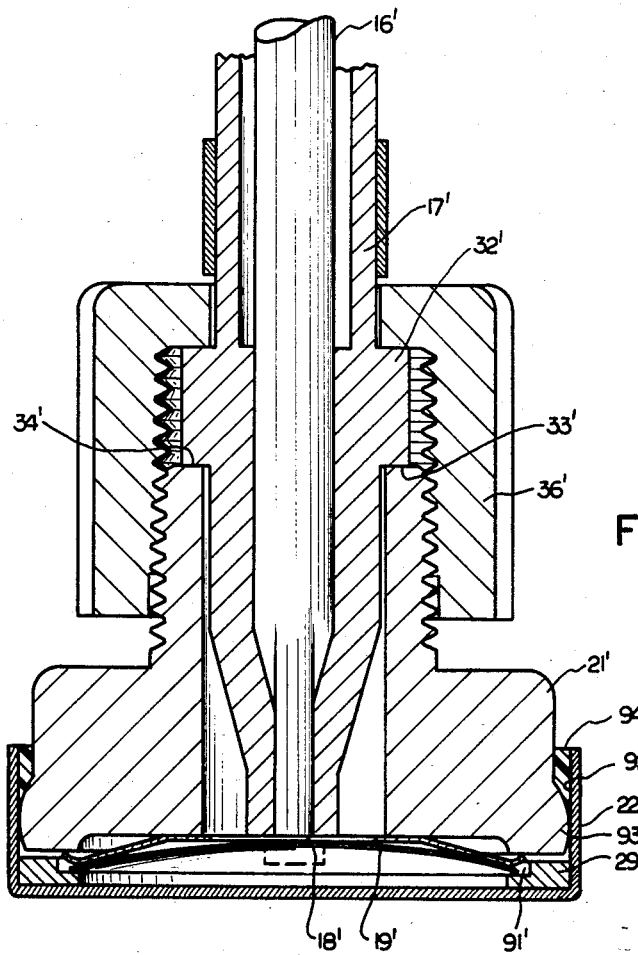
FIG.3
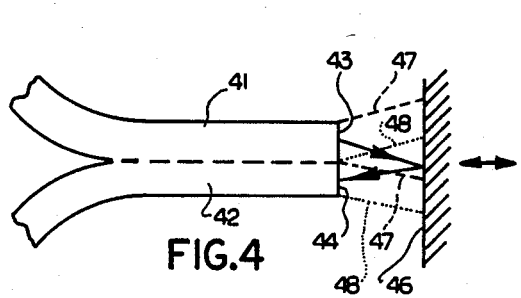
FIG.4
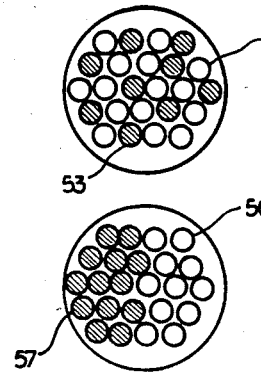
FIG.5
FIG.6

FIBER OPTICS CONDITION SENSOR AND METHOD OF MAKING SAME

BACKGROUND OF THE INVENTION

This invention relates generally to condition sensing devices such as temperature-responsive devices or pressure-responsive devices, and more particularly to a novel and improved condition sensor of such type combining fiber optics and a condition sensing diaphragm or disc, and to a novel and improved method of producing such devices.

PRIOR ART

It is known to use fiber optics to accurately measure the spacing between a fiber optics termination and a reflective surface. Examples of such systems are illustrated in U.S. Pat. Nos. 3,273,447; 4,309,618; and 4,358,960.

It is also known to position such reflective surface with a pressure-responsive diaphragm to provide a pressure-responsive device. Examples of such devices are illustrated in U.S. Pat. Nos. 3,580,082; 4,322,978; and 4,322,979. Such devices tend to utilize flat non-metallic diaphragms which are sufficiently elastic to provide a system which is quite sensitive to low pressures. Generally, such devices cannot be effectively used in relatively high pressure applications.

It is also known to combine fiber optics with bimetal sensors to provide temperature-responsive devices. An example of such a device is illustrated in U.S. Pat. No. 4,204,742.

It is also known to produce metallic discs with a curvature to modify their response to temperature or pressure, or both. Usually such discs are bumped to provide them with two positions of stability between which they move with snap action. When such discs are formed of bimetal, they are temperature-responsive. For pressure-responsive diaphragms or discs, the diaphragm is generally formed of a single homogeneous metal. Examples of such bimetal snap disc devices are illustrated in U.S. Pat. Nos. 3,500,278; 3,573,700; and 3,676,817. Examples of pressure-responsive snap discs are illustrated in U.S. Pat. Nos. 3,378,656 and 3,720,090.

SUMMARY OF THE INVENTION

There are a number of aspects to this invention. In accordance with one important aspect, a novel and improved combination of a bimetal snap disc or diaphragm and a fiber optics bundle is provided. Such combination provides a temperature-responsive optical sensor in which substantial changes in optical response occur abruptly when the disc snaps between its two positions of stability.

In accordance with another aspect of this invention, a bimetal disc is shaped to respond to a predetermined range of movement in response to a predetermined temperature change without snapping, and to provide a modulated temperature signal through such range of movement.

In accordance with another important aspect of this invention, a novel and improved pressure sensor combines fiber optics with a metallic disc shaped to provide a predetermined pressure response either with or without snap action.

In accordance with another aspect of the invention, novel and improved methods are provided for assembling temperature or pressure-responsive devices combining fiber optics and curved metallic diaphragms or discs.

In each illustrated embodiment, a reflective metallic disc is positioned adjacent to the termination of a fiber optics bundle, which is bifurcated to provide a first group of optical fibers for connection to a light source and a second group of optical fibers for conducting reflected light to a detector. The metallic discs are shaped to provide predetermined movement in response to a predetermined range of temperature or pressure conditions so that optimum signals are produced. The invention however is also applicable to a fiber optics transmitter system in which the transmitted light is reflected back to the detector through the same optical fiber or fibers through which light is transmitted from the light source. In such systems a beam splitter is used to deflect the light to the detector.

In one illustrated embodiment, the disc is formed of bimetal and is shaped to snap back and forth between two positions of stability at predetermined temperatures. When such device is intended for repeated operation, the fiber optics termination is positioned with respect to the disc so that the disc does not impact against the termination when it operates.

Another embodiment provides a non-snapping bimetal disc which is shaped to provide a predetermined rate of substantially linear movement within a predetermined temperature range. Such disc is again positioned adjacent to the fiber optics termination so that such movement efficiently provides reflective light value changes for producing accurate temperature signals by the light detector.

In another embodiment, a thin, metallic diaphragm is again formed with a shallow curvature so that it can respond to pressure in a predetermined selected manner. Such curvature can be established so that the diaphragm is either a snap acting diaphragm or a non-snapping diaphragm.

Two different methods of constructing such devices are illustrated. In accordance with one method, a body is provided with two locating surfaces which establish a fixed position between the periphery of the diaphragm and the termination of the fiber optics bundle, and the spacing between the locating surfaces is adjusted to compensate for variations of the curvatures of the diaphragms.

In the other method illustrated, gaging of the spacing between the diaphragm and the termination of the fiber optics bundle is provided by a method in which the fiber optics bundle is mounted on a first body member and the diaphragm is supported on a second body member, and the two body members are pushed together until a standard value of reflected light is achieved and thereafter the two body members are locked in such position with respect to each other.

These and other aspects of this invention are illustrated in the accompanying drawings, and are more fully described in the following specification.

BRIEF DESCRIPTION OF THE DRAWINGS

FIG. 3 is an enlarged, longitudinal section of another embodiment, in which gaging is achieved by moving first and second body members until a predetermined reflective light value is achieved;

FIG. 4 schematically illustrates the manner in which light supplied through one optical fiber is reflected back to a separate optical fiber;

FIG. 5 is a greatly enlarged view of a fiber optics termination in which the optical fibers are randomly arranged;

FIG. 6 is a view similar to FIG. 5, illustrating the termination in which the two groups of optical fibers are positioned in adjacent hemispheres within the termination;

DETAILED DESCRIPTION OF THE DRAWINGS

A fiber optics condition sensor in accordance with the present invention has many applications. For example, such a device is particularly suited for sensing a condition within a hazardous area, since the sensor portion of the device does not require any electrical circuitry which could produce a fire hazard. It is recognized that the light source and reflective light detector do involve electrical circuitry; however, such devices can be remotely located outside of the hazardous area being monitored by the sensor.

Figure 1:
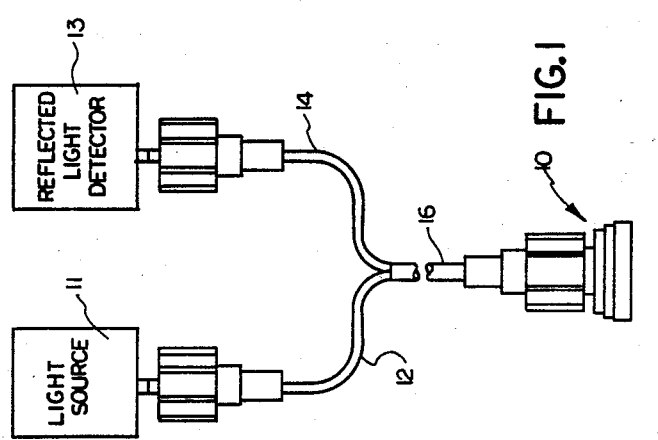
FIG. 1 illustrates a fiber optics sensor in accordance with the present invention and the manner in which it is connected to a schematically illustrated light source and a schematically illustrated reflective light detector.

FIG. 1 illustrates a typical system incorporating a fiber optics sensor in accordance with the present invention. Such system includes the sensor assembly 10, which is connected to a schematically illustrated light source 11 by a first group of optical fibers 12 and to a reflective light detector 13 by a second group of optical fibers 14. The two groups of optical fibers 12 and 14 merge to provide a fiber optics bundle 16 which extends to the sensor assembly 10.

Although the various illustrated embodiments provide fiber optics transmitters which include bundles of optical fibers which are bifurcated to provide two separate groups of fibers, this invention is also applicable to fiber optics transmitters in which the light from the light source is delivered to a reflective surface through the same fiber or fibers that carry the reflected light back to the detector. Such systems generally utilize a beam splitter which separate the paths of the source light and the reflective light. Further such systems may utilize only a single optical fiber or a bundle of optical fibers. The U.S. Pat. No. 3,273,477 illustrates in FIG. 5 thereof such a system and such figure and the related description is incorporated herein by reference to illustrate and describe such system.

The sensor assembly 10 includes a reflective diaphragm (discussed in detail below) which moves toward and away from the termination of the bundle 16 in response to changes in the conditions being sensed to change the value of the reflected light transmitted to the detector. The detector 13 is calibrated so that the output signal generated by the detector is a function of the amount of light reflected back through the second group of optical fibers 14 and is therefore a function of the conditions sensed by the sensor assembly 10.

The light source 11 and the detector 13 are schematically illustrated herein, since such devices are known to those skilled in the art, and the selection of the particular detector and light source from devices of such type available forms no part of this invention except to the extent that the light source 11 must be capable of uniformly producing a level of light sufficient to activate the system and the detector must be capable of uniformly producing an output signal which maintains the desired relationship between the intensity of the reflected light and the output signal so that the detector produces an output signal which is a consistent function of the condition being sensed.

Figure 2:
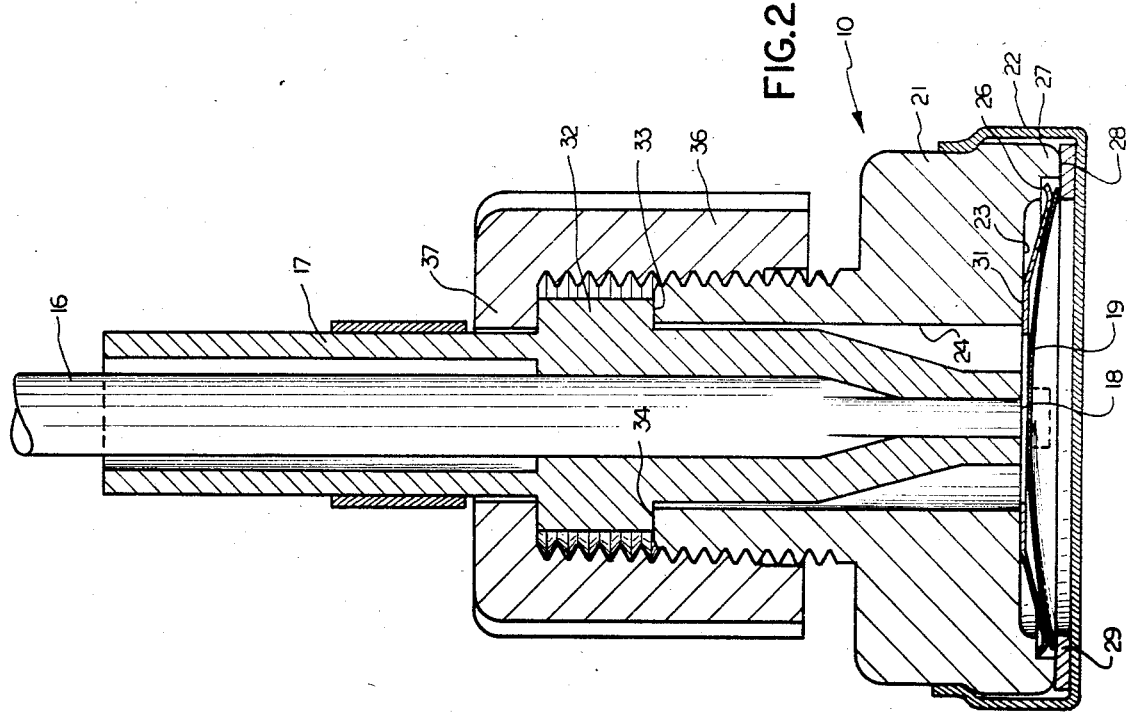
FIG. 2 is an enlarged, longitudinal section of one embodiment, illustrating the structural detail thereof.

FIG. 2 illustrates, at an enlarged scale, the structural details of one sensor assembly 10 in accordance with the present invention. In such device, the bundle of optical fibers 16 extends into a first tubular body 17 to a termination 18 of the optical fibers. At such termination, the tubular body 17 grips the bundle and maintains the optical fibers in a fixed position. The ends of the fibers and the end of the body 17 are precision-finished so that the ends of each of the optical fibers lie in a single plane coplanar with the ends of the remaining fibers. Therefore, the termination of the bundle 16 is planar and the ends of each of the fibers are formed so that light transmitted along the first group of fibers 12 is efficiently and uniformly transmitted through the ends of the fibers of the first group of fibers and the light reflected back to the termination is efficiently received and uniformly transmitted back along the fibers of the second group 14.

Positioned adjacent to the termination 18 is a condition-responsive disc or diaphragm 19 providing a corrosion-resistant reflective surface at least adjacent to the termination 18. Such diaphragm 19 is formed of thin metal with a shallow curvature, discussed in detail below, to provide it with the desired response to the condition being sensed. In the embodiment illustrated in FIG. 2, such diaphragm 19 is formed of bimetal, and is responsive to temperature changes.

The support for the diaphragm 19 is provided by a second body member 21 and a sheet metal cup 22. The second body member 21 is formed with a shallow, central recess 23 extending from a central bore 24 sized to receive the forward end of the first tubular body member 17 and the termination 18. Extending from the shallow recess 23 is a radial wall 26 extending to an axial flange 27. The axial flange 27 ends in a precision-formed, radial locating surface 28, against which a radial seat washer 29 is positioned by the cup 22. The periphery of the diaphragm 19 is resiliently pressed against the upper surface of the seat washer 29 by a spring 31. With this structure, the seat washer 29, in cooperation with the radial wall 26 and the axial flange 27, provides an annular groove which receives the periphery of the diaphragm 19 and accurately positions such periphery in the plane of the locating surface 28.

The first body member 17 is formed with a radially extending flange 32 provding a second locating surface 33 at the lower end thereof, which is formed with precision to a predetermined, longitudinal spacing from the plane of the termination 18.

A third locating surface 34 is precision-formed at the upper end of the second body member 21 for engagement with the second locating surface 33 so that the termination 18 is accurately located axially with respect to the second body member 21 and, in turn, the diaphragm 19. A nut 36 having an internal flange 37 is threaded onto the second body member 21, and engages the flange 32 to tightly press the two locating surfaces 33 and 34 together.

Because of the curvature formed in the diaphragm 19, and because the diaphragm is formed of bimetal, the central portion of the diaphragm moves toward and away from the termination 18 in response to changes in temperature. Therefore, the diaphragm causes a change in the reflective light value transmitted to the detector 13 by the second group of optical fibers 14, and this varies the output signal of the detector 13 as a function of the temperature of the diaphragm 19.

FIG. 4 schematically represents the manner in which light is reflected from one optical fiber to another, and how a change in the spacing of a reflective surface affects the amount of reflected light. If it is assumed two optical fibers 41 and 42 are positioned adjacent to each other and are provided with their terminations or ends 43 and 44, respectively, in a coplanar relationship, and if it is assumed that a reflective surface 46 is positioned in alignment with the two terminations 43 and 44, light delivered through the optical fiber 41 is reflected by the surface 46 back to the optical fiber 42. The light emerging from the optical fiber 41 tends to disperse as a cone indicated by the dotted lines 47. The reflective light entering the optical fiber 42 must be located within an imaginary cone indicated by the dotted lines 48. Thus, the light which is reflected from the optical fiber 41 to the optical fiber 42 is that light which reflects from the surface 46 within the overlapping portion of the two cones represented by the dotted lines 47 and 48. Since the curvature of the diaphragm is very slight, the central portion of the diaphragm which is active in reflecting the light can be considered a flat surface.

Figure 7:
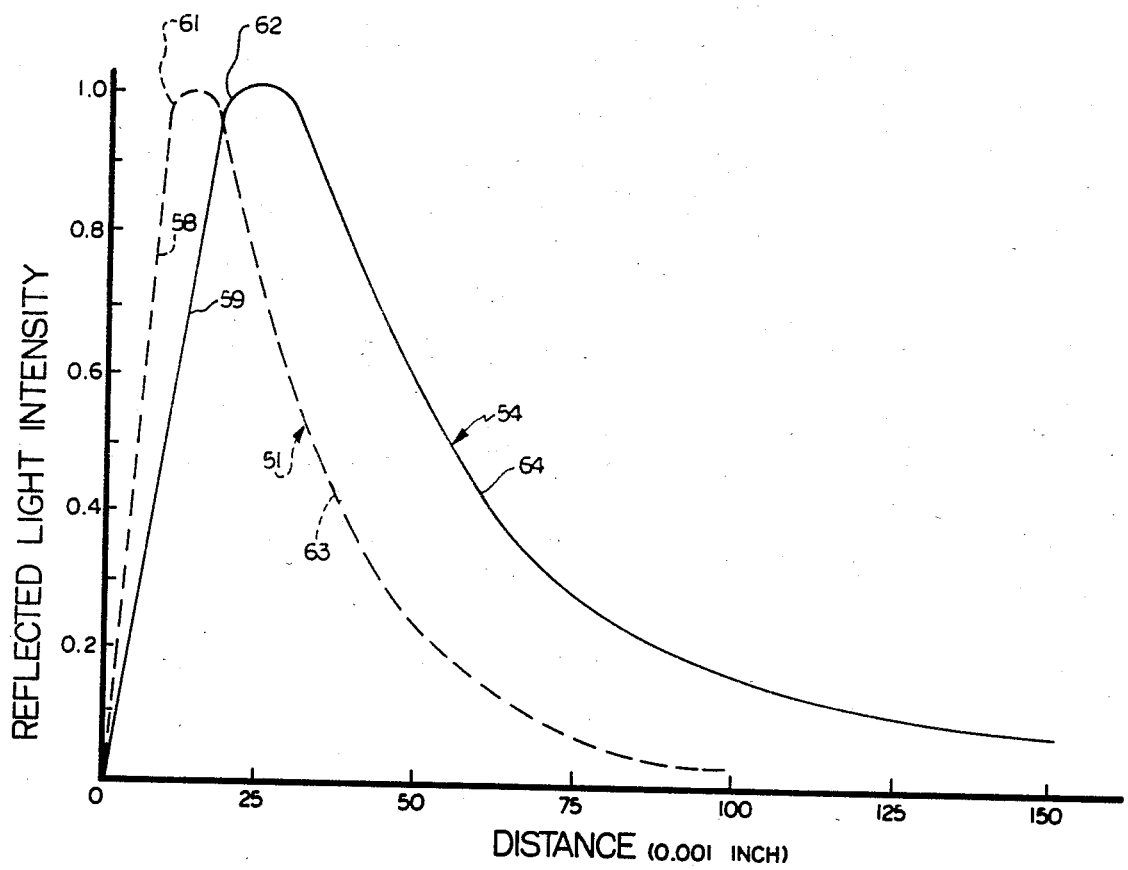
FIG. 7 is a graph illustrating the typical reflective response for randomly and hemispherically arranged fiber optics groups as a function of distance of the reflective surface from the fiber optics termination.

If the reflective surface 46 is moved toward and away from the termination of the optical fibers, it has been determined that a reflective light intensity curve having the shape of the curves illustrated in FIG. 7 is provided. For example, if the reflective surface 46 is moved to the left so that it actually engages the terminations 43 and 44, the reflective surface acts as a gate or door to prevent light from emerging from the fiber 41 and no light can be reflected to the fiber 42. Thus, if the distance between the reflective surface 46 and the optical fiber termination is zero, the zero reflective light is provided and the curves illustrated in FIG. 7 indicate such fact.

On the other hand, as the spacing between the reflective surface and the fiber optics termination increases, the reflective light intensity increases substantially along a straight line portion to a maximum, and thereafter drops back down from the maximum along a curve, as illustrated in FIG. 7.

The dotted curve 51 represents the response achieved when the fibers within the bundle are randomly arranged, as indicated in FIG. 5. In such an arrangement, the fibers connected to the light source are schematically illustrated by the empty circles 52 and the ends of the fibers connected to the reflective detectors are indicated by the circles 53, which are cross-hatched. As illustrated in FIG. 5, a random arrangement is provided in which the ends of the optical fibers 52 are substantially equally distributed across the entire termination, and the ends of the fibers connected to the detector are also substantially evenly distributed over the termination.

A response curve 54, which is generally similar to the response curve 51, is provided if the optical fibers are hemispherically arranged, as illustrated in FIG. 6. In such an arrangement, all of the fiber ends 56, which are connected to the light source, are located in one hemisphere of the termination, and all of the fibers 57 connected to the detectors, indicated as cross-hatched, are located in another hemisphere of the termination. It should be noted by comparing the two curves 51 and 54 that they both start at zero origin and extend upwardly with a substantially straight line portion 58 and 59 to a break in the curve located at 61 and 62, respectively. However, the slope of the curve 59 is not as steep as the slope of the curve 58, so that the response or change in reflective light intensity with a randomly oriented fiber optics termination, as illustrated in FIG. 5, is greater with respect to distance than the response of a hemispherically arranged termination as illustrated in FIG. 6 and represented by the line 59. Both types of termination tend to provide about the same peak intensity, and then follow a curve descending to the right, as viewed in FIG. 7, along the dotted line portion 63 in the case of the randomly oriented curve 51 and along the descending curved portion 64 in the case of the hemispherically arranged curve 54.

In accordance with the present invention, the curvature formed in the diaphragm 19 is selected so that the central portion of the diaphragm moves through a distance which is related to the reflection light intensity curve of the particular termination 18 involved in response to a predetermined range of temperatures. Such motion of the central portion of the diaphragm 13 may, in some instances, move with snap action, or may move with non-snapping action.

Figure 8:
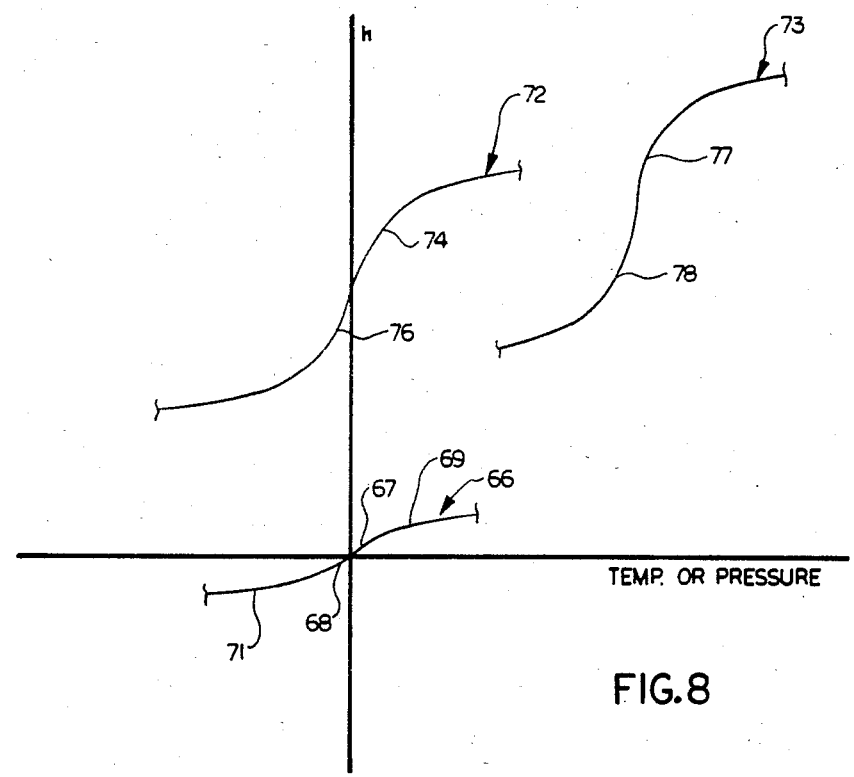
FIG. 8 is a plot of a series of displacement curves illustrating the manner in which the curves can be modified by changing the curvature of a thin, metallic diaphragm.
Figure 9:
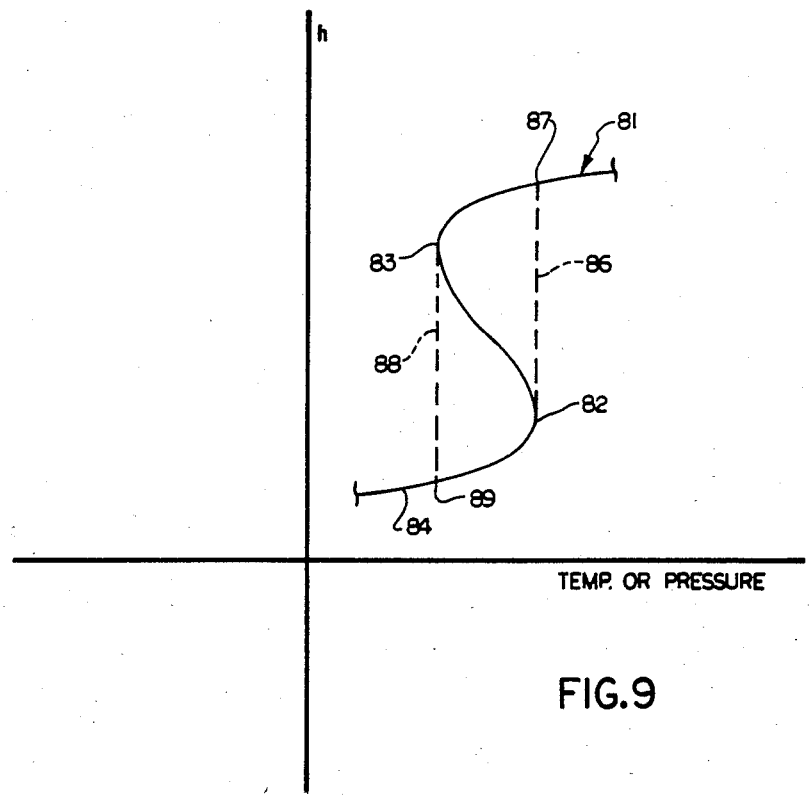
FIG. 9 is a temperature displacement curve of a typical snap diaphragm.

Reference should now be made to FIGS. 8 and 9, which represent different curves which may be obtained with a thin metal diaphragm by adjusting the unstressed curvature of such diaphragm. If the diaphragm is formed of bimetal, the displacement of the center portion will be responsive to temperature, and if the diaphragm is formed of a homogeneous metal, the diaphragm will be responsive to pressure.

In FIG. 8, the curve 66 represents the displacement which would be achieved with a flat metal diaphragm in response to temperature or pressure changes, as the case may be. Such a flat diaphragm will provide a curve which intersects the ordinance of the graphs at their intersection. As pressure or temperature conditions increase, as the case might be, the displacement of the center portion of the diaphragm would be substantially linear along a very short portion 67 at an angle determined by the scale of the two ordinances. Similarly, if the temperature were decreased below the standard temperature, or the pressure were decreased or applied in the opposite direction, the central portion of the diaphragm would be displaced in a negative direction through a small distance 68 in a substantially linear manner. However, as the pressure or temperature is increased or decreased, the curve of the displacement of the central portion of the diaphragm, indicated by the vertical ordinate h, would begin to curve toward a more horizontal portion, indicated by the curved portions 69 and 71 on the curve 66.

By deforming or preforming the material forming the disc, whether it be bimetal or homogeneous metal, to a shallow curved shape, it is possible to change the slope of the central portion of the curve and to change the displacement of the central portion with respect to the condition being sensed, as indicated by the two curves 72 and 73. For example, in the curve 72, a diaphragm is represented in which the displacement of the center portion is substantially linear between the points 74 and 76, and the slope of the curve between such points is substantially steeper than the corresponding portion of the curve 66. Such diaphragm, because of its curvature initially formed in the diaphragm, would provide greater displacement versus change in condition being sensed than the non-curved diaphragm represented by the curve 66. Further, the change in displacement of the central portion, which is substantially linear between the two points 74 and 76, is substantially greater in the diaphragm represented by the curve 72 than the corresponding linear displacement of the flat diaphragm represented by the curve 66.

A similar displacement versus change in condition being sensed is obtainable by properly adjusting the initial curvature of the disc, as illustrated by the curve 73. In such instance, the central portion of the curve between the points 77 and 78, along which the displacement is substantially linear with respect to condition being sensed, is further increased and the slope is further increased. In addition, the curvature initially formed in the diaphragm displaces the curve from the origin of the ordinance in a positive direction both with respect to displacement and condition being sensed.

In practice, it is even possible to cause the diaphragm to move with snap action with respect to displacement versus condition being sensed, as illustrated in FIG. 9. The curve 81 represents the displacement versus condition being sensed of the diaphragm, which is sufficiently curved in its free state to provide a negative spring rate along a portion of the curve. The formation of a diaphragm with such a curve is well known in the snap disc art, in which a disc or diaphragm snaps back and forth between two positions of stability in response to predetermined conditions being sensed. Such discs or diaphragms are shaped by a process, usually referred to as "bumping," to a shallow curvature so that the curves provide a negative spring rate between the points 82 and 83 of the curve.

For example, if the diaphragm is formed of bimetal and is in the position indicated at 84, it moves with creep action until the point 82 is reached. Such point is reached in the case of a bimetal diaphragm when the diaphragm reaches a predetermined temperature determined by the shape of the diaphragm. The diaphragm then snaps through along the dotted line 86 to the point 87, creating an almost instantaneous displacement of the center portion of the diaphragm without a corresponding change in temperature.

Subsequently, as the temperature of the diaphragm decreases, it moves again from the point 87 with a creep action until the point 83 is reached. Once the point 83 is reached, the diaphragm again snaps along the line represented by dotted line 88 back to the lower point on the curve at 89, where it again assumes a position of stability. The difference in the temperatures of the snap action, known as the differential temperature of the diaphragm, is represented by the horizontal spacing between the two lines 86 and 88. The vertical displacement along such lines represents the displacement of the central portion of the diaphragm with snap action. The vertical distance between the points 82 and 83 represents the distance through which the diaphragm snaps in both directions.

In accordance with the present invention, the curvature preformed into the diaphragm is selected so that the displacement of the center portion of the diaphragm, in response to a predetermined range of conditions being sensed, matches the reflective light intensity curve of the termination so as to provide an efficient reflective light response in a total system. For example, if is is desired to provide an abrupt change in the reflective value at two selected temperatures, the diaphragm 19 is formed with the proper curvature to produce a snap action at such two temperatures. Further, the displacement achieved during such snap action is selected to match the particular reflected light intensity curve of the associated bundle.

For example, if a bimetal diaphragm having a snap action is intended to be used with a randomly oriented fiber optics termination providing the curve 51 of FIG. 7, it would be desirable to provide a diaphragm having a displacement so that when it snaps toward the termination, it will move to a position very closely spaced to the termination, e.g., about 0.001 inch therefrom. Such a diaphragm would tend to creep back to a spacing of about 0.003 inch from the termination and provide a reflective value of about 0.35. Upon snapping through to the other position of stability, it would be desirable for the diaphragm to be arranged to snap around the crest of the curve slightly so that when it moved with creep action back toward its other snap position, it would be at a point of about 0.010 inch from the termination and would provide a reflected light intensity of about 0.9.

With a snap-acting diaphragm, it is desirable to structure the device so that the diaphragm does not impact the termination with snap action. It is for this reason that the minimum snap-acting spacing from the termination should be at least about 0.001 inch. In such a device, the intensity change when the diaphragm snapped away from the termination would be about 0.65, and the change of intensity when the diaphragm snapped toward the termination would be about 0.95. Such a system provides a wide change in reflective intensity, which can be easily detected to establish that the diaphragm has reached the temperatures at which it moves with snap action.

If difficulty is encountered in producing a snap-acting diaphragm having the desired temperatures of operation and a snap range which would fit the curve 51 of a randomly oriented termination, of course, the diaphragm can be used with a hemispherically arranged termination of the curve 54 so that more snap travel can be accommodated without impacting the termination or extending around the crest of the curve too much. For example, the point 61 on the curve 51 occurs at a displacement of about 0.010 inch, whereas, the point 62 on the curve 54 occurs at about 0.020 inch of displacment.

If it is desired to provide a modulated response to temperature, a disc is formed with curvature so that it will provide a substantially linear response through a displacement which is again matched to the reflective light intensity curve of the associated fiber optics bundle. For example, if it is desired to provide a temperature-responsive system through a temperature range from 80° F. to 130° F., the precurvature formed in the disc should be such that the disc moves with a substantially linear movement through a distance in the order of 0.010 inch when associated with the randomly oriented termination having a curve 51, illustrated in FIG. 7. On the other hand, if such diaphragm is intended for use with a hemispherically arranged termination illustrated in the curve 54, it is preferable to form the diaphragm with a precurvature which will provide a displacement of about 0.020 inch in such range of temperatures.

The amount of displacement which is substantially within a given temperature range is determined by the size of the diaphragm, the material used to form the diaphragm, the thickness of the diaphragm, and the curvature formed in the free state diaphragm. It is therefore possible in most instances to produce a diaphragm having a particulr desired, substantially linear displacement through a given temperature range.

Similarly, if the diaphragm is intended for pressure response, the thickness of the metal, the size of the diaphragm, and the type of the metal combined with the precurvature placed on the diaphragm, allow the production of a diaphragm having a substantially linear response through the desired pressure range. Although the aforementioned discussion involves the production of a sensor which functions along the portion of the reflected light intensity curve to the left of the points 61 and 62 in FIG. 7, it is also possible in some instances to operate on the portions of the curve to the right of the crest. However, since the slope of the curve to the right of the crest is not as straight as the portion of the curve to the left of the crest, it is preferable in most instances to arrange the device so as to function on the steep portion of the curve to the left of the crests.

FIG. 2 illustrates an embodiment in which the diaphragm can be either snap-acting or non-snap-acting. Further, in FIG. 2, the curvature is exaggerated for purposes of illustration.

In order to ensure that the central portion of the diaphragm has the correct spacing from the termination 18 when diaphragms having different curvatures are utilized, it is preferred to modify the spacing between the locating surface 28 and the locating surface 34 so as to position the periphery of the diaphragm 19 in the proper position to achieve the required spacing between the central portion of the diaphragm and the termination. For example, if the devices require diaphragms having a greater curvature, a corresponding greater spacing is provided between the two locating surfaces 28 and 34, and if the diaphragms are provided with a lesser amount of precurvature, the spacing of the locating surfaces 28 and 34 is reduced.

FIG. 3 illustrates another embodiment which is very similar to the embodiment of FIG. 2, except that the gaging to establish the proper spacing between the central portion of the diaphragm and the termination is achieved in a different manner. In this embodiment, similar reference numerals are used to indicate similar parts to the embodiment of FIG. 2, but a prime (') is added to indicate reference to the embodiment of FIG. 3.

Here again, a bundle of optical fibers 16' is mounted in a first body member 17' to provide a planar termination 18'. The body member 17' is again provided with a flange 32' providing a locating surface 33' held in engagement with a locating surface 34' on a second body member 21' by a nut 36'. In this instance, however, the body member 21' does not provide a locating surface corresponding to the locating surface 28 of the embodiment of FIG. 2, or a flange corresponding to the flange 27 of the first embodiment. Instead, a washer seat 29' is formed with a step 91' which both axially and radially locates the diaphragm 19'.

In this embodiment, the cup 22' is not clenched in around the body 21', but is, instead, provided with a cylindrical wall 92' which is sized to provide an interference fit with an enlarged, curved portion 93' formed on the body 21'. Gaging is achieved by connecting the first group of optical fibers to a standard light source, and the other group of optical fibers to a standard reflective light detector. The body member 21', with the optical fiber bundle mounted thereon, is pushed in along the cup while the diaphragm is maintained at a standard condition, such as a standard temperature, until the detector indicates a standard reflective light intensity. Further movement of the body member 21' into the cup 22' is then terminated and an epoxy or similar settable material 94' is applied between the wall of the cup and the periphery of the body to lock the assembly in such position. With this method of assembly, variations in the curvature of diaphragms, variations in the reflective character of the diaphragms, and variations in the dimensions of all of the other parts are automatically compensated for and a device is manufactured which produces a standard value of reflected light intensity at the standard temperature of the diaphragm.

It is pointed out that it is known, as illustrated in U.S. Letters Pat. No. 3,636,622, to provide a press fit assembly for gaging of bimetal snap disc thermostats, and it is also known to utilize such a method of assembly for calibrating snap disc thermostats.

The embodiment of FIG. 3 may be used with diaphragms which either are snap-acting or non-snap-acting.

Figure 10:
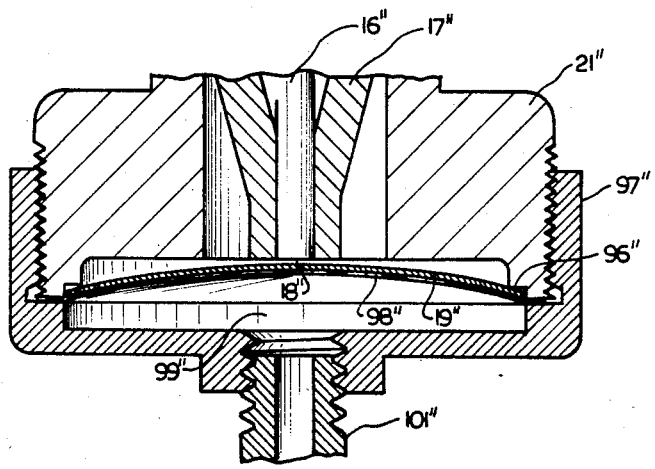
FIG. 10 is an enlarged, longitudinal section of an embodiment in which the diaphragm or disc is responsive to pressure rather than temperature.

FIG. 10 illustrates an embodiment which may be used for a device which is pressure-responsive. Here again, the structure is quite similar to the prior embodiment of FIG. 2. Therefore, similar reference numerals are provided to indicate similar parts, but a double prime (") is added to indicate reference to the embodiment of FIG. 10.

In the embodiment of FIG. 10, the fiber optics bundle 16" is again mounted on a first body member 17" and is in turn mounted on a second body member 21" by a nut (not illustrated). The termination 18" is, therefore, located in a fixed position relative to the body member 21". In this embodiment, the diaphragm 19" is normally formed of a homogeneous metal, and is responsive to pressure. The periphery of the diaphragm is located against a surface 96" on the body 21" by a cup 97", which is threaded onto the body 21". In this instance, a thin, flexible diaphragm 98" is positioned below the metallic diaphragm 19" to provide a highly flexible seal defining a pressure cavity 99". A pressure fitting 101" threads onto the cap 97" to connect the device to the pressure system being sensed. The diaphragm 98" may be formed of any suitable material provided it is capable of withstanding the pressures to be encountered, and it should be sufficiently flexible that it does not alter the response of the diaphragm 19" to any material extent. Further, since the pressure acting through the diaphragm tends to hold the periphery of the diaphragm against the shoulder 96", it is not necessary to provide a positioning spring corresponding to the spring 31 of the first embodiment.

Again, the proper spacing between the central portion of the diaphragm 19" and the termination 18" is established by the proper location of the shoulder 96" with respect to the surface corresonding to the locating surface 34 of the first embodiment, and such spacing is adjusted to compensate for variations in the curvature of the diaphragm.

If the spacing between the termination 18 and the locating surface 33 on the first body member 17 is established with precision, it is possible to separately assemble the diaphragm on its body, and thereafter install the fiber optics bundle. In such instance, gaging is separately established during the manufacture, and the subassembly, consisting of the diaphragm and its association body, can be supplied as a separate item for subsequent assembly with a standard fiber optics bundle.

With the present invention, it is possible to reliably produce improved fiber optics condition sensing devices which respond accurately to the condition or conditions being sensed. Further, the device and the method of assembly described herein lend themselves to automated production so as to reduce assembly costs.

Although the preferred embodiments of this invention have been shown and described, it should be understood that various modifications and rearrangements of the parts may be resorted to without departing from the scope of the invention as disclosed and claimed herein.

What is claimed is:

1. A method of producing fiber optics condition sensors operable to sense changes in condition through a predetermined range of conditions comprising providing fiber optics transmitters adapted to connect a light source and a light detector in which said transmitters provide a planar termination at an end remote from said transmitter and detector, determining the range of distance through which a substantially planar reflective surface moves toward and away from said termination to produce minimum and maximum values of reflected light transmitted through said fiber optics transmitter from said source to said detector, forming metal diaphragms with a precurvature so that a substantially planar center portion thereof moves between two predetermined positions through substantially said entire range of distance in response to said predetermined range of conditions, mounting said terminations on body assemblies, mounting the peripheries of a diaphragm on one of said body assemblies and positioning said termination and periphery so that said center portion in one of said predetermined positions is positioned substantially against said termination and when in the other of said predetermined positions is substantially spaced therefrom so that the value of light reflected to said detector varies from substantially said minimum value to substantially said maximum value when said diaphragm is exposed to said predetermined range of conditions.

2. A method as set forth in claim 1, including selecting the relative position of said mounting of said terminations and said periphery of said diaphragms to compensate for differences in curvatures preformed in said diaphragms.

3. A method as set forth in claim 2, including providing said body assemblies with a body member having two locating surfaces, one of said locating surfaces operating to locate said termination and the other of said locating surfaces operating to locate said periphery of said diaphragm, and compensating for the difference in curvature of said diaphragms selecting the spacing of said locating surfaces.

4. A method as set forth in claim 2, including forming said body assemblies with first and second telescoping body members, mounting one of said terminations on a said first body member, mounting said periphery on one of said diaphragms on a said second body member; and while said transmitter is connected to a standard light source and to a standard light detector and said diaphragm is maintained at a standard sensed condition telescoping said members together until a calibrated position is reached when said detector establishes that a predetermined light intensity is reflected through said transmitter, and locking body members in said calibrated position.

5. A method as set forth in claim 1, including forming said diaphragms with precurvature to cause said central portion to move with snap action in response to predetermined conditions, and positioning said diaphragms so that the center portion thereof is spaced from said termination when it snaps toward said termination to prevent impacting of said center portion against said termination.

6. A method as set forth in claim 1, wherein said sensors are operable to sense temperature and said diaphragms are formed of bimetal.

7. A method as set forth in claim 1, wherein said sensors are operable to sense pressure and said diaphragms are formed of a homogeneous metal.

8. A method as set forth in claim 1 wherein said transmitters includes a first group of optical fibers adapted to be connected to said light source and a second group of optical fibers adapted to be connected to said light detector, said groups being joined in a single bundle providing said planar termination.

9. A method of producing fiber optics condition sensors comprising forming optical fiber transmitters extending to a single planar termination, forming metallic diaphragms with unstressed curvatures selected to cause a substantially planar center portion thereof to move through a predetermined range of movements in response to a predetermined range of sensed conditions, providing a reflective surface on said central portion, and mounting said diaphragm and said optical fiber transmitter on a body assembly with the periphery of said diaphragm in a fixed position relative to said termination in which said reflective surface moves toward and away from said termination and responds to sensed conditions, and compensating for differences in curvature formed in said diaphragms by establishing said fixed position of said periphery of said diaphragm relative to said termination so that said reflective surface is spaced a predetermined distance from said termination under a standard value of said sensed conditions.

10. A method of producing fiber optics condition sensors for sensing a range of conditions comprising providing fiber optics transmitters having a planar termination having a reflective value curve and which are adapted to be connected to a remote light source and a remote light detector, determining the spacing of a reflective surface versus reflection value curve of said termination to establish a range of spacing between said termination and a reflective surface which produces substantially zero reflection between said source and detector and a maximum value of reflection between said source and detector, forming reflective metallic diaphragms with a curvature so that a substantially planar center portion thereof moves through a distance substantially equal to said range of spacing in response to said range of conditions to be sensed, and mounting the periphery of said diaphragms in a fixed position relative to said termination determined by the amount of curvature of said diaphragms so that said center portion of said diaphragms moves through substantially said range of spacing in response to said range of conditions to be sensed.

11. A method of producing fiber optics condition sensors comprising providing an optical fiber transmitter terminating at a termination, connecting said optical fiber transmitter to a standard light source and to a standard light detector, forming a diaphragm with a shallow curvature to provide it with a central substantially planar reflective portion providing the desired response to the conditions being sensed, forming first and second body members so that they can be telescoped together, mounting said termination on said first body member, mounting said diaphragm at its periphery on said second body member, telescoping said body members together to move said reflective portion towards said termination to a position in which said detector indicates a predetermined value of reflective light, and locking said members in said position.

12. A method as set forth in claim 11, wherein said body members are provided with a press fit to temporarily maintain them in said position until said members are locked in said position.

13. A fiber optics condition sensor comprising a body assembly, an optical fiber transmitter mounted on said body assembly providing a termination located at a predetermined location, said transmitter being adapted to be connected at a location remote from said termination to a light source and to a light detector and operable to transmit light between said termination and said source and detector, a metallic diaphragm mounted on said body assembly, said diaphragm being performed with a curvature providing a substantially planar central portion movable in response to a sensed condition toward and away from said termination, said central portion providing a reflective surface adjacent to said termination operable to reflect light from said source to said detector, said bundle and reflective surface providing a reflective range from a maximum possible reflective value to a minimum possible reflective value as a function of the changing of the spacing between said reflective surface and said termination through a first predetermined range of movement, the relationship between the movement of said reflective surface and the changes of the conditions sensed being an S-curve with substantially greater slope within a second predetermined range of movement than provided by a similar flat diaphragm formed of the same metal, said shallow curvature causing said reflective surface to move through said second predetermined range of movement in response to a predetermined range of sensed conditions, said first and second predetermined ranges of movement being substantially equal, said mounting of said fiber optics bundle and mounting of said diaphragm being selected to cause the light reflected to said termination by said reflective surface to vary through a substantial portion of said reflective range in response to movement of said reflective surface through said second predetermined range of movement.

14. A condition sensor as set forth in claim 13, wherein said diaphragm moves through said second predetermined range of movement with snap action, said diaphragm being positioned with respect to said termination so that it moves to a position substantially adjacent to but spaced from said termination as it snaps toward said termination to prevent impacting of said termination by said diaphragm.

15. A condition sensor as set forth in claim 13, wherein said diaphragm moves with non-snapping movement through said second predetermined range of movement and at a rate which is a substantially linear function with respect to the change of conditions sensed by said diaphragm.

16. A condition sensor as set forth in claim 13, wherein said diaphragm is formed of bimetal and the condition being sensed is temperature.

17. A condition sensor as set forth in claim 13, wherein said diaphragm is formed of a homogeneous metal and the condition being sensed is pressure.

* * * * *